Patented Apr. 25, 1944

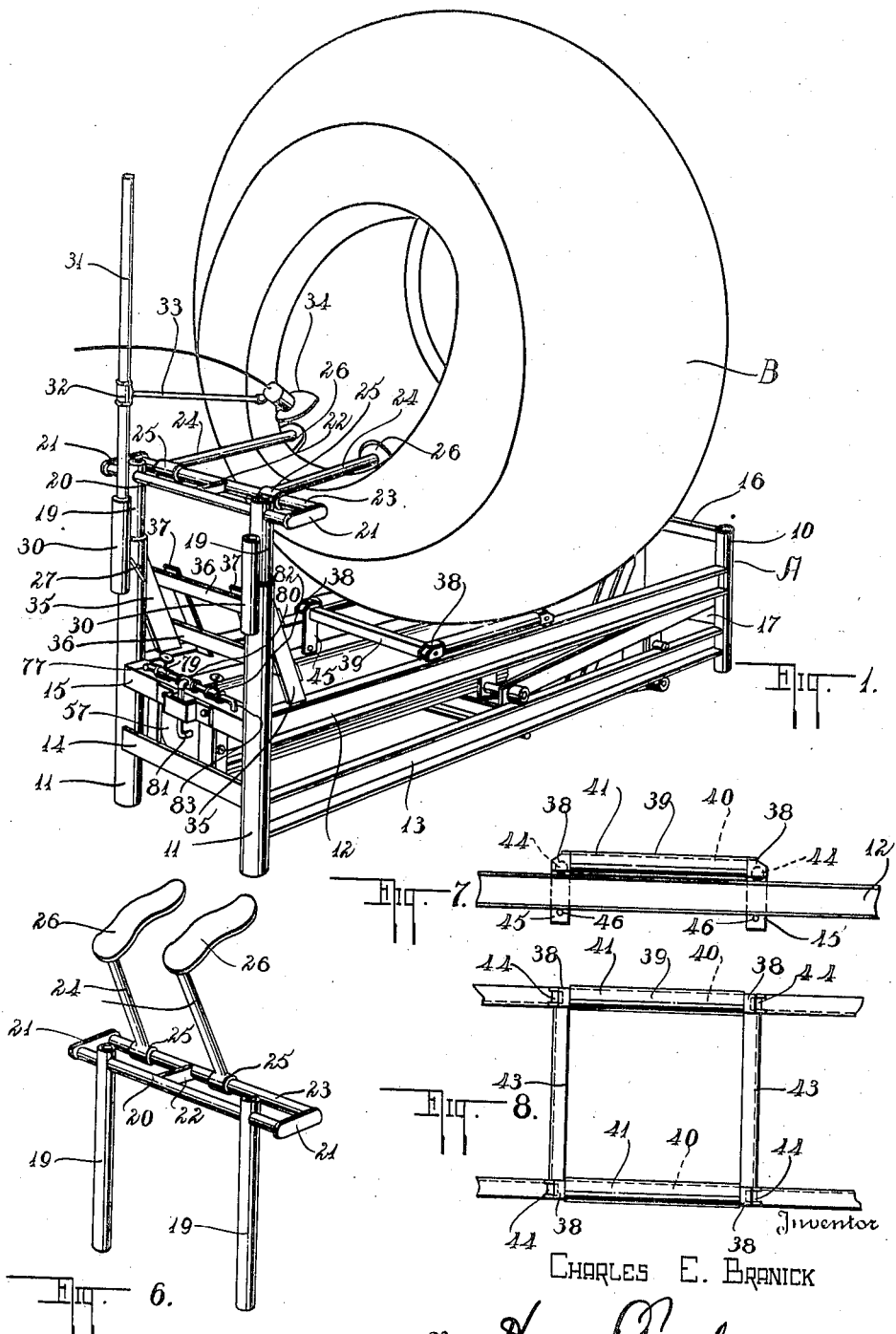

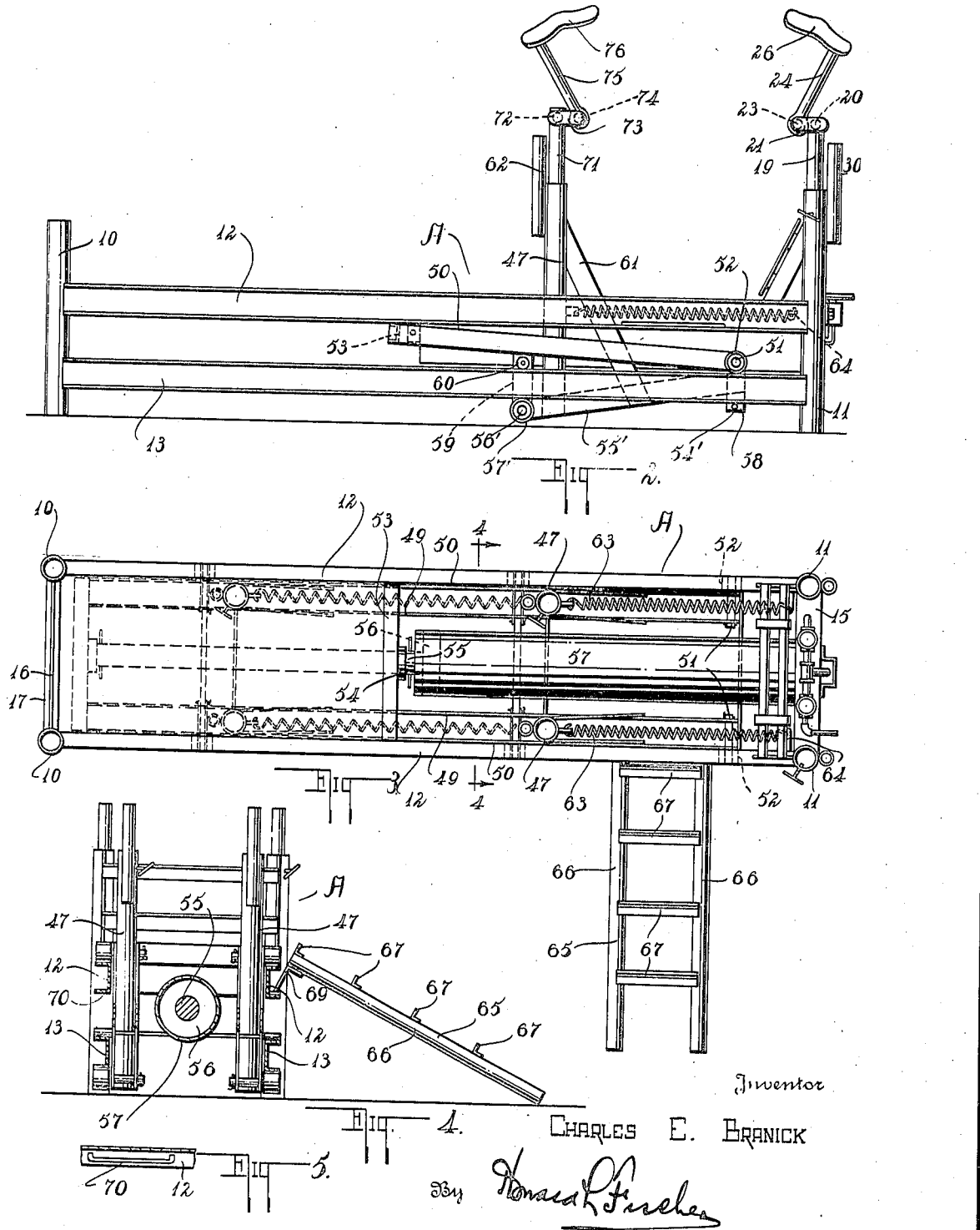

2,347,311

UNITED STATES PATENT OFFICE 2,347,311

TIRE SPREADER

Charles Earl Branick, Fargo, N. Dak.

Application July 31, 1940, Serial No. 348,934

5 Claims. (Cl. 154—9)

My invention relates to an improvement in tire spreaders wherein it is desired to provide a device designed particularly for use with large size tire casings which will spread these casings to allow inspection or repair of the inner surface of the casing.

It is common practice to spread a tire casing for inspection and for repair by means of a tire spreading apparatus which draws the opposite sides of the tire casing apart. Some of these machines hold the tire with the axis thereof vertical, while others hold the tire with a horizontal axis. My tire spreader operates in a different manner than other spreaders in that it hooks on both sides, but one side only is slidable and which requires the rolling frame on the carriage for the tread of the tire to slide back on while it is being spread. Thus I provide a construction of spreader which is adapted for handling heavy truck, bus and tractor tires.

It is a purpose of the present invention to provide a tire spreading device including a table or frame upon which the tire is placed and to provide a frame readily slidable longitudinally thereof so that as the tire is spread, the carriage supporting the tire moves with the tire to assist the spreading action. This construction eliminates the friction usually encountered in the spreading of tires and facilitates the spreading operation.

It is a purpose of the present invention to provide an elongated frame upon which the tire is designed to rest and to provide a stationary set of engaging means on said frame engageable with one side of the tire casing. A movable spreading element is longitudinally slidable on the frame and is provided with hooks to engage the other side of the tire casing. A hydraulic cylinder or the like is interposed between the fixed and movable portions, supporting the fixed and movable tire engaging means in order to move these tire engaging means apart to spread the tire.

It is an important feature of my invention that the hook supporting means are readily adjustable and may be adjusted in height, or the spacing of the two tire engaging means for each side of the tire may be regulated to spread a greater or lesser amount of the tire.

It is a further feature of my invention to provide an incline which may be used in combination with the tire supporting frame so that the tire to be spread may be rolled into place rather than lifted. This incline is secured to the frame in position to accommodate a tire to be rolled upon the frame or may be detached when necessary during the inspection of the tire.

These and other objects and novel features of my invention will be more fully and clearly set forth in the following specification and claims.

In the drawings forming a part of my specification:

Figure 1 is a perspective view of my tire spreader.

Figure 2 is a side elevation view of the same.

Figure 3 is a top plan view of my tire spreader.

Figure 4 is a cross-sectional view, the position of the section being indicated by the line 4—4 of Figure 3.

Figure 5 is a detail view of a portion of the frame designed to engage the ramp or incline.

Figure 6 is a perspective detail of the support for the tire engaging means.

Figure 7 is a side elevation view of a portion of the frame and the tire supporting carriage.

Figure 8 is a top plan view of the carriage illustrated in Figure 7.

The tire spreader A comprises a pair of upright end supports 10 forming legs at one end of the frame, and a pair of hollow tubular uprights 11 in parallel spaced relation thereto. Each upright 10 is connected to its corresponding upright 11 by means of a pair of vertically spaced channels 12 and 13. The uprights 11 are connected together in parallel spaced relation by a transverse brace strip 14 and by a transversely extending angle 15. The uprights 10 are connected in parallel spaced relation by a pair of transversely extending braces 16 and 17. Thus a substantially rectangular frame is formed, each side of which is comprised of a pair of spaced parallel channels with the parallel sides thereof facing outwardly.

The uprights 11 are provided with telescopically arranged tubes or rods 19 which project from the top of the uprights 11 and which are connected by a transverse bar. A pair of links 21 and a central brace 22 connect the cross member 20 with a bar 23 which extends parallel to the bar 20 in spaced relation thereto. A pair of hooks 24 are journalled at 25 upon the bar 23 and these hooks are provided with hook ends or plates 26 designed to engage the inner surface of a tire or within the bead of the same. It will be noted that the hooks 24 may be pivoted into or out of engagement with the tire, and it will further be noted that the spacing of these hooks may be adjusted to spread a greater or smaller portion of the tire B. A set screw or thumb screw 27 is provided in one of the uprights 11 engageable with one of the tubes or rods 19 to hold the same in properly adjusted relationship.

A pair of tubular sockets 30 are secured to the uprights 11 and project above the top of the same. These sockets 30 are designed to selectively receive a rod 31 upon which is adjustably secured a journal 32 of a bracket 33 supporting the light 34. The light 34 may be adjusted in position and the rod 31 may be placed in either of the sockets 30 where it will not interfere with the inspection or work being done.

A pair of inclined braces 35 are welded to the uprights 11 and to the upper surface of the channel 12 to further support the uprights 11. These inclined braces 35 are connected by a pair of transverse members 36 which in turn are connected by a pair of inclined strips 37. The brace constructed in this way guides the tire B into proper position as it is rolled onto the frame and prevents the tire from coming too close to the end of the frame.

A carriage 39 is mounted upon the upper channels 12 and is movable longitudinally with respect thereto. The carriage is best illustrated in Figures 7 and 8 of the drawings, and includes a pipe or rod 40 upon which is rotatably mounted a pair of hollow tubular members 41. Hollow brackets 38, the construction of which is best illustrated in Figure 1 of the drawings, connected to the end of the rod or tube 40 and the opposed brackets 38 are connected by connecting angles 43. Rollers 44 are pivotally secured on transverse axes within the hollow brackets 38 and these rollers 44 project beneath the bottom of the brackets 38 to engage the channels 12. One side of each of the brackets 38 is extended to form a downwardly projecting arm 45 which extends beneath the level of the channels 12. A pin 46 in each arm 45 extends beneath the channel 12 to hold the carriage 39 in place.

As best illustrated in Figures 2, 3 and 4 of the drawings, a pair of vertical standards 47 are secured to a movable means which is movable longitudinally of the frame. The moveable means includes a pair of spaced arms 49 and 50 provided on each side of the frame. These arms 49 and 50 are pivoted to aligned pivots 51 which also support rollers 52. The rollers 52 rest upon the lower channel 13. The other extreme ends of the arms 49 and 50 are all connected by a transversely extending connecting channel 53. The channel 53 is provided with a socket 54 which accommodates the end of the plunger rod 55 of the plunger 56 within the cylinder 57. Thus upon movement of the plunger rod 55 the arms 49 and 50 are drawn longitudinally of the frame, drawing the rollers 52 along the tops of the channels 13.

A pair of downwardly extending bracket arms 58 are pivoted to the pivots 51 and a pin 51' extends through these bracket arms beneath the channel 13. Thus the rollers 52 are held in place upon the surface of the channels 13. A pair of brace arms 55' are secured to the brackets 58 and support the pivots 56' of the rollers 57'. The rollers 57' engage the under surface of the channels 13. The brackets 59 are connected to the pivots 56' and support rollers 60 which engage the upper surface of these channels 13. Thus the rollers 57' are held in engagement with the under surface of the channels 13. The vertical supports 47 extend between the arms 55' and are secured thereto. Brace arms 61 connect the arms 55' with the supporting posts 47 to hold these posts in vertical position. Sockets 62, similar in purpose and construction to the sockets 30 previously described, are welded to the posts 47 for supporting the light bracket 33.

Springs 63 are secured to the vertical posts 47 and to ears 64 welded to the inner surface of the channels 12 for normally drawing the vertical posts 47 toward the vertical supports 11. The plunger 56 within the cylinder 57 acts when operated to force the arms 49 and 50 away from the fixed supporting posts 11, drawing the vertical posts 47 therewith. During this longitudinal movement, the rollers 52, 57' and 60 ride upon the upper and lower surface of the channels 13.

An incline or ramp 65 is provided by means of which a tire may be rolled onto the frame of the spreader. This ramp or incline comprises a pair of spaced pipes 66 connected by a series of spaced connecting angles 67. A transversely extending angle 69 is provided on the under surface of the ramp or incline at the upper end thereof and this angle is designed to engage behind a rib 70 best illustrated in Figure 5 of the drawings, which is applied to the inner surface of the channel 12 to hold the incline in place during the time the tire is being elevated.

The vertical upright posts 47 are provided with telescopically arranged posts or rods 71 which are identical in form to the tubes or rods 19 previously described. A transverse connecting member 72 connects the upper extremities of the posts 71, and links such as 73 connect the transverse member 72 with a parallel spaced transversely extending rod 74.

A pair of hook arms 75 are journalled on the transverse rod 74 and support hook ends 76 which engage the inner surface of the tire B. The operation of my tire spreader is believed clearly understood from the foregoing description. The air inlet 77 is connected through the valve 79, the T connection 80 and the pipe 81, to the cylinder 57. The T 80 is also connected through the valve 82 with an air outlet 83. When it is desired to spread the tire, the valve 79 is operated, admitting air from the air inlet 77 to the cylinder 57, moving the plunger 56 therein and sliding the vertical posts or supports 47 away from the vertical posts or supports 11. The hooks 75 are thus pulled away from the hooks 24, spreading the casing between the sides thereof.

When the tire is spread, the valve 79 may be closed to hold the air within the cylinder 57 until it is desired to release the tire. In order to release the tire from the hooks, the valve 82 is opened, permitting the compressed air within the cylinder 57 to exhaust through the outlet 83, thus permitting the springs 63 to draw the vertical posts 47 toward the posts 11. As the spreading and contraction of the tire takes place, the surface of the tire rests upon the carriage 39 and is thus movably supported upon the spreader frame.

In placing a tire on the spreader or in removing a casing from the spreader, this casing or tire B is rolled up or down the incline or ramp 65. When not in use, this ramp may be removed from engagement with the machine frame.

The vertical posts 47 are well supported, being welded to the arms 49 and 50, the braces 61 and the arms 55'. The links or brackets 59 may connect the arms 50 and 49 with the arms 55', thus forming a solid supporting means for movably supporting the movable spreader arms.

In accordance with the patent statutes I have described the principles of construction and operation of my tire spreader and while I have endeavored to set forth the best embodiments thereof, I desire to have it understood that obvious changes may be made within the scope of the following claims without departing from the spirit of my invention.

I claim:

1. A tire spreader including an elongated horizontal frame, a movable carriage longitudinally movable on said frame and designed to support a casing arranged transversely to the frame on a horizontal axis, hook means pivotally secured to said frame adjacent one end thereof, and relatively movable hook means engageable with the other side of the casing, and means for forcing the two hook means apart for spreading the casing.

2. A tire spreader comprising an elongated horizontal frame, a pair of vertical supports at one end of said frame, a transverse pivot rod secured to said vertical supports, a pair of hook arms pivotally and slidably journalled on said pivot rod, hook ends on said hook arms engageable with a side of a tire adapted to be placed transversely on a horizontal axis on said frame, a pair of vertical supports movably mounted longitudinally of said frame, a transverse pivot rod secured to said last named vertical supports, a pair of slidably and pivotally mounted hook arms on said pivot rod, hook ends on said last named hook arms engageable with the other side of the tire casing, and means to move said moveable supports longitudinally on said frame.

3. A tire spreader comprising an elongated frame having two tiers of longitudinally extending tracks, vertical standards secured to one end of said frame, hooks pivoted to said standards, a moveable carriage on the upper track of said frame and adapted to support a tire casing placed thereon, a second moveable carriage on the lower track of said frame, vertical standards secured to said second carriage, hooks pivoted to said carriage standards, and means to move said second carriage longitudinally on said frame.

4. A tire spreader comprising an elongated frame having two tiers of longitudinally extending tracks, a plurality of vertically adjustable standards secured to one end of said frame, hooks pivoted to some of said standards, a light-holding arm pivoted to one of said standards, a moveable carriage on the upper track of said frame and adapted to support a tire casing placed thereon, a second moveable carriage on the lower track of said frame, vertical standards secured to said second carriage, hooks pivoted to said carriage standards, and means to move said second carriage longitudinally on said frame.

5. A tire spreader comprising an elongated horizontal frame including longitudinally extending tracks, a pair of vertical standards movably mounted longitudinally of said frame, a second pair of vertical standard means secured in fixed relation at one end of said frame, hook means pivoted to said standard means, said hook means engageable with opposite sides of a tire casing, and means for moving said movable supports longitudinally on said frame.

CHARLES EARL BRANICK.